United States Patent
Ishii et al.

(10) Patent No.: US 6,795,625 B1
(45) Date of Patent: Sep. 21, 2004

(54) SPACER FOR OPTICAL FIBER CABLE AND OPTICAL FIBER CABLE USING THE SPACER

(75) Inventors: Toku Ishii, Gifu (JP); Kazunori Watanabe, Gifu (JP); Kenji Ito, Gifu (JP)

(73) Assignee: Ube-Nitto Kasei Co., Ltd., Tokyo (JP)

( * ) Notice: Subject to any disclaimer, the term of this patent is extended or adjusted under 35 U.S.C. 154(b) by 486 days.

(21) Appl. No.: 09/762,362

(22) PCT Filed: Jun. 1, 2000

(86) PCT No.: PCT/JP00/03536

§ 371 (c)(1), (2), (4) Date: Feb. 5, 2001

(87) PCT Pub. No.: WO00/75705

PCT Pub. Date: Dec. 14, 2000

(30) Foreign Application Priority Data

Jun. 3, 1999 (JP) .......................... 11/156965

(51) Int. Cl.$^7$ ................................. G02B 6/44
(52) U.S. Cl. .................. 385/110; 385/112; 385/113
(58) Field of Search ............... 385/102–106, 385/109–113

(56) References Cited

U.S. PATENT DOCUMENTS 4,814,133 A * 3/1989 Kitagawa et al. .......... 264/1.28
4,997,258 A   3/1991 Oestreich
5,638,478 A * 6/1997 Iwakura et al. ............. 385/111

FOREIGN PATENT DOCUMENTS

| EP | 0362621 | 4/1990 |
| JP | 2-28606 | 1/1990 |
| JP | 4-2165 | 1/1992 |
| JP | 10-319284 | 12/1998 |
| JP | 2871745 | 1/1999 |
| JP | 11-109190 | 4/1999 |
| JP | 11-109194 | 4/1999 |

* cited by examiner

Primary Examiner—Akm Enayet Ullah
Assistant Examiner—Jerry T Rahll
(74) Attorney, Agent, or Firm—Jordan and Hamburg LLP

(57) ABSTRACT

A polyethylene spacer for optical fiber cable including a central tensile member, an intermediate coating layer arranged on an outer periphery of the central tensile member and being compatible with polyethylene and a main coating arranged on an outer periphery of the intermediate coating layer and having continuous spiral grooves for accommodating optical fibers and which are inverted periodically in a lengthwise direction. The main coating is formed from polyethylene resin. The spacer includes ribs defining the spiral grooves. A minimum thickness of the ribs is 1.0 mm or less, the groove inclination angle α of a cross section of the spacer at inversion part is 18° or less. A resin density of a root part of each rib is the lowest in comparison to a resin density at a tip part of the rib and central parts of the rib between the root part and the tip part.

6 Claims, 4 Drawing Sheets

SPACER FOR OPTICAL FIBER CABLE AND OPTICAL FIBER CABLE USING THE SPACER

FIELD OF THE ART

This invention concerns an SZ-spiral-grooved spacer for optical fiber cable, an optical fiber cable that uses this spacer, and a method for producing this spacer, and in particular, concerns an SZ-spiral-grooved spacer, which is made thin in diameter as a result of the groove inclination at the inversion parts being restricted even though the minimum rib thickness is 1.0 mm or less.

BACKGROUND ART

The making of optical fiber cables thin in diameter, lightweight, and high in optical wiring density is being pursued to reduce cable prices and laying costs, and there have been stringent demands for making polyethylene (PE) spacers, which accommodate optical fibers, thin in diameter as well.

Meanwhile, with recent aerial optical fiber cables, intermediate post-branching performance of the optical fibers is being required in addition to high optical wiring densities, and this has lead to the frequent use of SZ-type optical fiber cables, which use a PE spacer (SZ spacer), having grooves that accommodate the optical fibers and are alternately inverted in spiraling direction in SZ-like manner, and with which a plurality of tape-form optical fibers are accommodated within each groove of the spacer.

In the case where a rigid optical tape is to be accommodated used in an SZ spacer, the dimensions of an accommodating groove must enable the securing of adequate space for allowing the twisting of the tape. Also, though the polyethylene resin that comprises the rib undergoes three-dimensional molding shrinkage (sum of the shrinkage due to recrystallization during solidification and volume shrinkage due to lowering of the resin temperature) in the process of extrusion molding, unlike in the case of a unidirectionally stranded spacer, with which there is no allowance for shrinkage of the ribs in the length direction, in the case of an SZ spacer, lengthwise shrinkage of the ribs is possible in the form of short-cutting the inversion curve at just the inversion part, and as a result, the ribs can collapse towards the inner side of the inversion curve.

This phenomenon becomes more prominent when the ribs are made thin in root thickness and, along with the abovementioned securing of groove space, this has been a factor that has hampered the making of SZ slots thin in diameter.

It is considered that besides the molding shrinkage of the resin, the collapsing of the ribs may be caused by the mutual pulling of the coating resins, due to differences in the drawdown of the resin, etc., in the process of performing extrusion coating from a nozzle.

In the case of an optical fiber cable that uses a thin-diameter SZ spacer, with which the minimum rib thickness at the root, etc. of the rib is thin, the inversion pitch must be made short in order to allow for extra lengths of optical fiber, and since the inclination angle of the groove at the inversion part thus becomes large, the transmission loss is increased inevitably.

An object of this invention is to provide an SZ-spiral-grooved spacer for optical fiber cable, with which the groove inclination at the inversion parts of the SZ spacer is restricted and is low in the increase of transmission loss, and an optical fiber cable that uses this spacer to realize the making of optical fiber cables thin in diameter.

DISCLOSURE OF THE INVENTION

In order to achieve the above object, this invention provides in a polyethylene spacer for optical fiber cable, with which a thermoplastic resin, with compatibility with polyethylene, is applied as an intermediate coating layer onto the periphery of a central tensile member and with which a main coating, having continuous spiral grooves that are for accommodating optical fibers and are inverted periodically in direction along the length direction, is formed from polyethylene on the outer periphery of the abovementioned intermediate coating layer, a spacer such that the minimum rib thickness of the ribs that define the abovementioned spiral grooves is 1.0 mm or less and the groove inclination angle in the spacer cross section of the inversion parts is 18° or less.

This invention also provides in a polyethylene spacer for optical fiber cable, with which a main coating, having continuous spiral grooves that are for accommodating optical fibers and are inverted periodically in direction along the length direction, is formed from polyethylene on the outer periphery of a central tensile member, a spacer such that the minimum rib thickness of the ribs that define the abovementioned spiral grooves is 1.0 mm or less and the groove inclination angle in the spacer cross section of the inversion parts is 18 or less.

With the spacer of the above arrangement, the resin density of the portions substantially at the roots of the ribs that define the abovementioned spiral grooves may be made the smallest in comparison to the tip parts of the ribs and the central parts of the ribs.

With the spacer of the above arrangement, the average roughness of the groove bottoms of the abovementioned spiral grooves may be made 1.2 $\mu$m or less.

With the spacer of the above arrangement, the spiral progression angle ($\beta$), as determined by $$\tan\beta = (d \times \pi \times \theta/360)/p$$

where d is the outer diameter, $\theta$ is the spiral groove inversion angle, and p is the spiral groove inversion pitch, may be set in the range, 5 to 15°.

Also with the present invention, the spacer of the above arrangement may be used to accommodate a plurality of tape-form optical fibers in at least one or more spiral grooves to form an optical fiber cable.

Also with the present invention, the spacer of the above arrangement may be used to accommodate a single-core optical fiber in at least one or more spiral grooves to form an optical fiber cable.

Furthermore, the present invention provides in a method for producing a polyethylene spacer for optical fiber cable, with which a thermoplastic resin, with compatibility with polyethylene, is applied as an intermediate coating layer onto the periphery of a central tensile member and with which a polyethylene main spacer coating, having continuous spiral grooves that are for accommodating optical fibers and are inverted periodically in direction along the length direction, is formed on the outer periphery of the abovementioned intermediate coating layer, a production method wherein after the abovementioned main spacer coating spacer is applied, a cooling medium is blown, obliquely at a predetermined angle with respect to the running direction of the abovementioned spacer, onto the outer periphery of the abovementioned spacer.

This invention also provides in a method for producing a polyethylene spacer for optical fiber cable, with which a polyethylene main spacer coating, having continuous spiral grooves that are for accommodating optical fibers and are inverted periodically in direction along the length direction, is formed on the periphery of a central tensile member, a production method wherein after the abovementioned main spacer coating spacer is applied, a cooling medium is blown, obliquely at a predetermined angle with respect to the running direction of the abovementioned spacer, onto the outer periphery of the abovementioned spacer.

This invention also provides in a method for producing a polyethylene spacer for optical fiber cable, with which a polyethylene main spacer coating, having continuous spiral grooves that are for accommodating optical fibers and are inverted periodically in direction along the length direction, is formed on the outer periphery of a central tensile member, a production method wherein a reinforced fiber bundle, which comprises the abovementioned tensile member, is drawn upon being impregnated with an uncured thermosetting resin, then upon inserting this reinforced fiber bundle into a melt extrusion molding die, a polyethylene resin is extruded and coated onto the outer periphery, then after cooling the coated resin on the surface, the thermosetting resin in the interior is cured, and then after applying the abovementioned main spacer coating onto the outer periphery of the abovementioned coating resin, a cooling medium is blown, obliquely at a predetermined angle with respect to the running direction of the abovementioned spacer, onto the outer periphery of the abovementioned spacer.

With the method for producing a spacer for optical fiber cable of the above-described arrangement, the cooling medium may be warm water of 40° C. or more to which a surfactant has been added.

Also with the method for producing a spacer for optical fiber cable of the above-described arrangement, the cooling medium may be dry air or may be moist air, including mist.

Furthermore with the above-described production method, the abovementioned predetermined angle may be set to an angle of within 30° to 150°.

Also with the above-described method for producing a spacer for optical fiber cable, optical fibers may be accommodated in the abovementioned spiral grooves after cooling and solidifying the abovementioned main spacer coating by the blowing on of an abovementioned cooling medium and a sheath coating may be provided by press winding a non-woven fabric around the outer periphery to produce an optical fiber cable.

With this optical fiber cable production method, if a spacer with which the inclination of the spiral grooves is restricted is to be obtained, it will be effective to employ the method of reheating the spacer, obtained after application of the main spacer coating, to a temperature of 60° or more and yet less than or equal to the melting point while applying tension and inserting a sizing device, etc. that inserts a pin, etc., into the spiral grooves.

The central tensile member that can be used in this invention is not restricted in particular, and may be a single steel wire, stranded steel wire, single FRP wire, stranded FRP wire, polymer tensile member, etc. that is selected according to the tensile strength, flexibility, lightweightness, economy, etc. that are in accordance with the tensile strength required of an optical fiber cable.

The intermediate coating layer of thermoplastic resin at the outer periphery of the tensile wire must be bonded to or strongly adhered to the abovementioned tensile wire in the case where the tensile wire is a single wire but in the case where the tensile wire is a stranded wire and anchor adhesion by the stranded structure can be anticipated, bonding may not be necessary.

As the thermoplastic resin to be used in the intermediate coating layer, a resin, which has mutual compatibility with the polyethylene resin (to be referred to as the "main spacer coating resin") that is coated onto the outer periphery of the intermediate coating layer and forms the grooves, is selected.

Here, having compatibility means that the thermoplastic resin of the intermediate coating layer and the main spacer coating resin are mutually high in compatibility and are in a relationship where melt adhesion is possible or in a relationship where bonding to some degree is possible by the use of an adhesive, solvent, etc.

In the case where a high-density, medium-density, or low-density polyethylene is selected as the main spacer coating resin, a resin of the same type or a modified resin of the above, etc. is used as the resin for the intermediate coating resin.

With the polyethylene optical fiber spacer by this invention, a known heat-resistant stabilizer, age resister, anti-weathering stabilizer, hydrochloric acid absorber, lubricant, organic or inorganic pigment, carbon black, gum resister, fire retardant, antistatic agent, filler, etc. may be added to the polyethylene resin.

Furthermore, as the need arises, an eutectic copolymer resin of a cyclic olefin and ethylene, an alloy resin, a modified polyethylene resin, or a crosslinked polyethylene resin may be mixed.

The continuous spiral grooves for accommodating the optical fiber, which are inverted periodically in direction along the length direction, are formed by melt extruding and coating a polyethylene resin, and the inversion angle ($\theta$) and period of inversion (inversion pitch p) of the spiral grooves are designed according to the specifications of the optical fiber cable.

In general, an inversion angle ($\theta$) of 275°±5 is deemed to be preferable as indicated in Japanese patent publication No. 13687 of 1995, and with the present invention, the inversion angle is also selected within the range, 200 to 375°, which is centered about the abovementioned inversion angle.

With the spacer for thin-diameter optical fiber cable by this invention, the minimum rib thickness of the ribs that define the spiral grooves is 1 mm or less. When the minimum rib thickness exceeds 1 mm, the proportion of the cross section of the spacer taken up by the groove part becomes small, making it difficult to achieve a thin diameter and a high density. A minimum rib thickness of 0.9 mm or less is therefore even more preferable.

As shown in FIG. 4, the groove inclination angle refers to the angle indicated by the narrow angle a formed by the line L1, which joins the spacer center O and the groove bottom center A in the cross section of the inversion part of the SZ spacer, and the line L2, which joins the groove bottom center A and the center B of the outer width of the groove, and is measured from an enlarged photograph of the cross section of the spacer.

When an optical fiber is housed with the groove inclination angle $\alpha$ at the inversion part exceeding 18°, the transmission loss tends to increase. The allowable range was thus limited to 18° or less.

Also in terms of restricting the groove inclination angle a at the inversion part to 18° or less, the spacer of this invention is preferably a spacer for optical fiber cable with which the resin density at substantially the root parts of the ribs that define the spiral grooves is the lowest in comparison to those of the tip parts of the ribs and the central parts of the ribs.

The resin density at the root parts can be made smaller than those at the tip parts of the ribs and the central parts of the ribs by performing the cooling and solidification of the root parts at an early stage, and as a result of this, the root parts become lower in crystallinity and relatively lower in resin density than the gradually cooled central parts and tip parts of the ribs.

Thus with the production method of this invention, a cooling medium is blown, obliquely at a predetermined angle with respect to the running direction of the above-mentioned spacer, onto the spacer in the process of applying the main spacer coating, which has continuous spiral grooves for accommodating the optical fiber that are inverted periodically in direction along the length direction, onto the outer periphery of the intermediate coating layer that is coated onto the tensile wire.

With the main spacer coating, it is considered that the spacer that is melt extruded in the prescribed form with grooves and ribs is in the condition where it is surrounded by a high-temperature sheath with a temperature gradient ranging from the melt resin temperature to the ambient temperature, and in view that this temperature sheath must be peeled off to promote cooling and cause solidification by blowing on a cooling medium, the cooling medium is blown onto the outer periphery of the spacer to cause this peeling off of the temperature sheath to occur at an early stage at the groove parts.

Thus after melt extrusion from the die, the cooling medium is blown onto the bottom part of the groove in the case where the cooling medium is air, mist, etc. On the other hand, if the cooling medium is a liquid, it must be made to contact the groove.

When the cooling medium is blown onto the groove bottom, the root parts of the ribs that are positioned at the sides of a groove bottom are cooled earlier and with more priority than the intermediate parts of the rib. When the root parts or the ribs are cooled in this manner, the shapes of the ribs will be stabilized at an early stage and inclination thereof can be prevented effectively.

In the case where the cooling medium is a liquid, warm water of 40° C. or more, to which a surfactant has been added, is preferable from the point of economy since washing treatment, etc. are unnecessary after the process.

A surfactant is added since if only warm water without surfactant is used, air bubbles become attached to the surface of the main spacer and traces of these bubbles will remain as so-called blobs after cooling and solidification.

The temperature of the warm water is set to 40° C. or more since at a temperature of less than 40° C., rapid cooling will occur and unfavorable vacuum voids, etc. will form in the main spacer.

The cooling medium may be dry air or moist air, including mist. In the case where mist is to be used, it is preferable to adjust the mist concentration to a concentration in a range at which the mist will vaporize and not aggregate on the groove walls, etc. and at which the particle diameter of the mist will have a cooling effect and will not lead to visible attachment marks.

In blowing or contacting the cooling medium onto the groove bottoms of the spiral grooves, the cooling medium is blown at a predetermined rate and obliquely at an angle of 30° to 150° with respect to the longitudinal axis of the running spacer.

At an angle of blowing that is less than 30° or greater than 150°, the flow of the cooling medium becomes an adjoint flow or counterflow that is parallel to the spacer, preventing the cooling medium from flowing effectively to the groove parts, significantly lowering the action of peeling off the high-temperature sheath formed around the main spacer, and making it difficult to restrict the groove inclination angle $\alpha$ at the inversion parts to 18° or less.

With this invention's method for producing a spacer for optical fiber cable, the drawdown is preferably set to 70% or less. Here, with the main spacer coating, the drawdown is defined as ($[Sb/Snb] \times 100$) where $Sb$ is the cross-sectional area of the main spacer that is formed and $Snb$ is the actual cross-sectional area of resin discharge from the nozzle (the cross-sectional area obtained by subtracting the cross-sectional area of the coated tensile wire from the area of the nozzle opening).

When the drawdown is set to 70% or more or even more preferably to 90% or more and the die land area is set to a prescribed length, melt fracture is prevented, the mutual pulling of resins caused by the drawdown of the resin during discharge is relaxed, etc.

Furthermore, with regard to the mechanical characteristics of the main spacer coating resin, it is preferable for the flexural modulus to be 490 Mpa or more in order to prevent deformation of the ribs due to the making of the rib thickness thin in accompaniment with the making of the cable thin in diameter.

It is important for the spacer for optical fiber cable to have a prescribed flexibility in order to facilitate handling in the process of actually laying an optical fiber that uses the spacer for optical fiber cable.

For example, in the case where the spacer is to be used in an aerial optical cable, if the spacer for optical fiber cable is poor in flexibility, not only will this have an effect on production of the optical fiber but the laying of the optical cable is made difficult, etc. as indicated in laid-open Japanese patent publication No. 113932 of 1995.

Thus with regard to the mechanical characteristics of the intermediate coating resin, the flexural modulus is set to 98 to 490 Mpa to avoid such effects.

With the spacer of this invention, the groove bottoms of the spiral grooves are preferably made 1.2 $\mu$m or less in average roughness. This is because the optical fiber or tape core wire that is accommodated within the spiral grooves of the spacer come in direct contact with the groove bottoms and if the surface roughness of the groove is large, microbending occurs in the optical fiber, which leads to increased transmission loss, especially in the long wavelength range ($\lambda = 1.55$ $\mu$m). This problem can be resolved by making the surface roughness 1.2 $\mu$m or less.

PREFERRED EMBODIMENTS OF THE INVENTION

Figure 1:
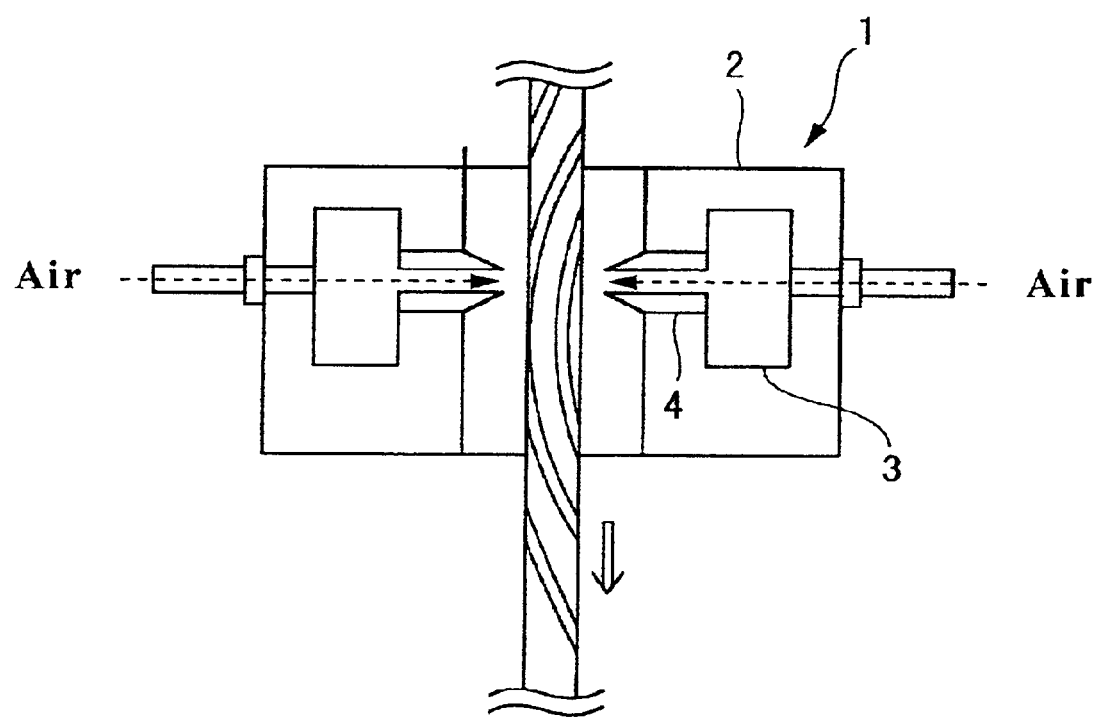
FIG. 1 is an explanatory drawing of the cooling device used in the first example of this invention.

Embodiments of this invention shall be described below in detail by way of specific examples.

First Example

A single steel wire of 2.0 mmφ outer diameter was introduced as the tensile member 11 into a crosshead die, and an ethylene-ethyl acrylate copolymer resin (GA 006; made by NIPPON UNICAR Co. LTD) and an LLDPE resin (NUCG 5350; made by NIPPON UNICAR Co. LTD) were co-extrusion coated at 200° C. as inner preliminary coating layer 12a and outer preliminary coating layer 12b, respectively, onto the outer periphery of the above-mentioned tensile member 11 to obtain a coated tensile wire 12, with which the outer diameter of the ethylene-ethyl acrylate polymer layer was 2.8 mmφ and the outer diameter of the LLDPE resin coating at the outer side was 6.3 mmφ.

This coated tensile wire 12 was preheated to 60° C. and introduced into a rotating die of a shape corresponding to the cross-sectional shape of the spacer, and after rotation extrusion coating on a high-density polyethylene resin (Hizex 6600M; made by Mitsui Chemicals; flexural modulus: 833Mpa), with an MI of 0.03(g/10 min), as the main spacer resin 13 at an extrusion temperature of 170° C. and a rate of 10 m/min, the coated tensile wire was introduced into the cooling device 1 shown in FIG. 1 to cool and solidify the polyethylene resin.

The cooling device 1 used in this example is equipped with a nozzle supporting part 2, an annular space part 3, provided inside this nozzle supporting part 2, and a cooling nozzle part 4, which is opened in slit-like manner so as to encircle the inner periphery of annular space part 3 and with which the front end opening protrudes inwards in a ring-like manner. Dry air was fed as the cooling medium from the outer periphery side of annular space part 3.

The spacer was inserted into the center of cooling nozzle 4 and was run at a predetermined drawing speed in the direction indicated by the arrow in FIG. 1. The dry air, which was fed into annular space part 3, was blown out from cooling nozzle 4 at a wind velocity of 10 m/sec and perpendicularly (orthogonally) onto the spacer and was blown onto the groove bottoms of the spacer to cool the root parts of the ribs with priority over the intermediate parts. By applying such a cooling treatment, a PE spacer 10 of 11.4 mmφ outer diameter was obtained.

The cross-sectional area of the hole of the resin discharge nozzle of the rotating die that was used was designed so that the percentage value of Sb/Snb (referred to hereinafter as the drawdown), obtained by dividing the cross-sectional area Sb, obtained in turn by subtracting the cross-sectional area St of the coated tensile wire from the cross-sectional area Ss of the PE spacer to be made, by the cross-sectional area Snb, obtained in turn by subtracting the cross-sectional area St of the coated tensile wire from the cross-sectional area Sn of the nozzle hole, will be 95%.

The PE spacer 10 thus obtained had ten trapezoidal grooves of 2.4 mm groove depth, 2.4 mm outer groove width, and 1.2 mm inner groove width positioned at equal intervals in the circumferential direction. These grooves had a spiral structure, which was twisted in SZ-form at an inversion pitch of 230 mm and an inversion angle of 250°. The minimum rib thickness of the ribs 15 at the rib root was approximately 0.8 mm. The PE spacer 10 obtained thus had the targeted dimensions and shapes and satisfied the various specifications.

Figure 4:
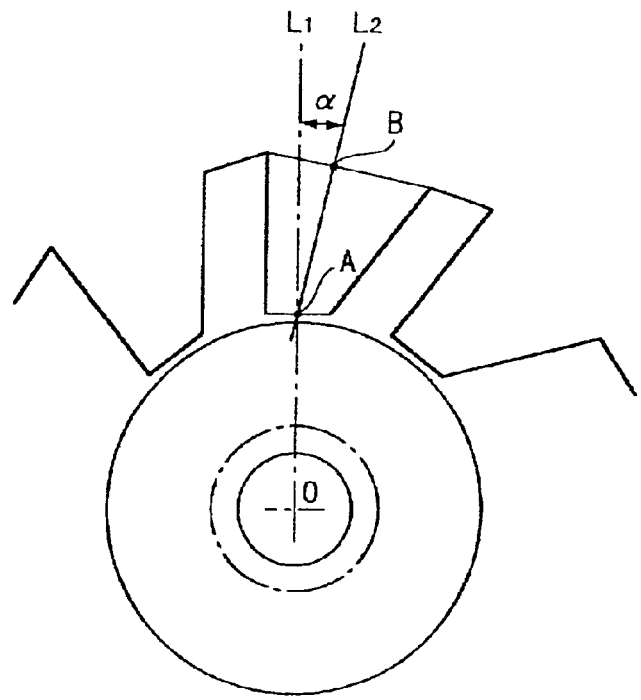
FIG. 4 is a diagram for explaining the groove inclination angle a of the cross section of the inversion part of an SZ spacer.

Measurement of the groove inclination angle α, expressed as the narrow angle between the line L1, which joins the spacer center O and the central part A of the groove bottom in the cross section of the inversion part of the SZ spacer 10, and the line L2, which joins the central part A of the groove bottom and the central part B of the outer width of the groove, showed it to be approximately 14°, thus indicating that the groove inclination was restricted adequately (see FIG. 4).

Measurements by the method of JISB 0601 showed the average surface roughness Ra ($\mu$m) of the groove bottoms of the spacer 10 obtained to be 0.40 $\mu$m.

Figure 3:
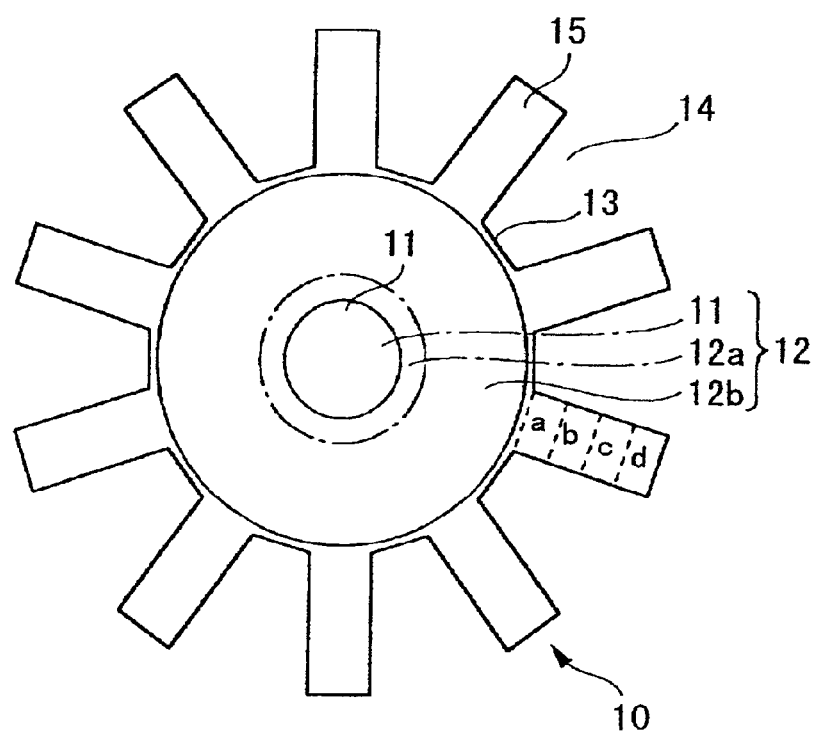
FIG. 3 is a sectional view of rotation of the SZ spacer of the first to fourth examples of this invention.

One of the ribs of the SZ spacer 10 formed from the main resin was cut off, this rib was divided into four parts (a to d) from the root to the tip as shown in FIG. 3, and the resin densities were measured using a density gradient tube. The measurement results are shown in Table 1.

A 200-core, SZ type optical fiber cable was obtained by layering and accommodating five 4-core tape-form optical fibers of 0.32 mm thickness and 1.1 mm width in each groove of the above-described SZ spacer and providing a sheath coating by press winding non-woven fabric. Measurements of the optical transmission performance showed this optical fiber cable to exhibit good performance of 0.21 dB/km.

Second Example

Figure 2:
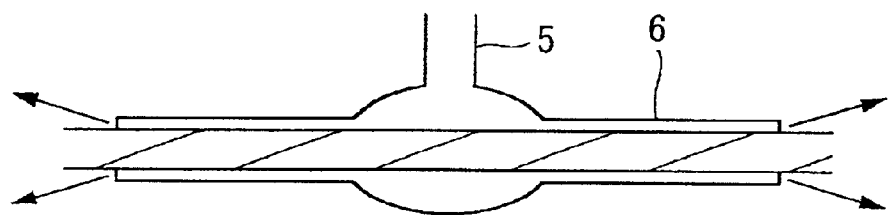
FIG. 2 is an explanatory drawing of the cooling device used in the second example of this invention.

Besides cooling the main spacer resin by inserting the main spacer resin into a pipe 6, having an inner diameter of 13 mm, a length of 250 mm, and being provided with a spherically spreading cooling medium inlet 5 at the center as shown in FIG. 2, and cooling and solidifying the resin by introducing room-temperature air as the cooling medium at a flow rate of 50 m$^3$/hr into the cooling medium inlet 5, a PE spacer 10 of 11.4 mmφ outer diameter was obtained by the same method as the first example.

The cross-sectional dimensions, inversion pitch, inversion angle, etc. of this SZ spacer 10 were equivalent to those of the first example, and measurement of the groove inclination angle α at the inversion part section showed it to be approximately 12°.

Measurement by the same method as the first example showed the average surface roughness of the groove bottoms of this spacer 10 to be 0.62 $\mu$m.

One of the ribs of the SZ spacer 10 formed from the main resin was cut off, this rib was divided into four parts from the root to the tip, and the resin densities were measured using a density gradient tube. The measurement results are shown in Table 1.

In the same manner as in the first example, a 200-core, SZ type optical fiber cable was obtained by accommodating five 4-core tape-form optical fibers in each groove. Measurements of the optical transmission performance showed this optical fiber cable to exhibit good performance of 0.20 dB/km.

Third Example

Besides using warm water of 40° C., to which a surfactant (Marpon 60; made by Matsumoto Yushi-Seiyaku Co., Ltd) was added to a concentration of 0.1 wt %, as the cooling medium for the main spacer resin, the same method as that of the second example was used to obtain an SZ type PE spacer 10 of 11.4 mmφ outer diameter.

The cross-sectional dimensions, inversion pitch, inversion angle, etc. of this SZ spacer 10 were equivalent to those of the first example, and measurement of the groove inclination angle α at the inversion part section showed it to be approximately 10°.

Measurement by the same method as the first example showed the average surface roughness of the groove bottoms of this spacer 10 to be 0.54 $\mu$m.

One of the ribs of the SZ spacer 10 formed from the main resin was cut off, this rib was divided into four parts from the root to the tip, and the resin densities were measured using a density gradient tube. The measurement results are shown in Table 1.

In the same manner as in the first example, a 200-core, SZ type optical fiber cable was obtained by accommodating five 4-core tape-form optical fibers in each groove. Measurements of the optical transmission performance showed this optical fiber cable to exhibit good performance of 0.19 dB/km.

Fourth Example

Using warm water of 40° C., to which a surfactant (Marpon 60; made by Matsumoto Yushi-Seiyaku Co.,Ltd ) was added to a concentration of 0.1 wt %, as the cooling medium for the main spacer resin and using the same cooling device 1 as the first example, an SZ type PE spacer 10 of 11.4 mmφ outer diameter was obtained by the same method as that of the first example.

The cross-sectional dimensions, inversion pitch, inversion angle, etc. of this SZ spacer 10 were equivalent to those of the first example, and measurement of the groove inclination angle α at the inversion part section showed it to be approximately 11.

Measurement by the same method as the first example showed the average surface roughness of the groove bottoms of this spacer 10 to be 0.50 μm.

One of the ribs of the SZ spacer 10 formed from the main resin was cut off, this rib was divided into four parts from the root to the tip, and the resin densities were measured using a density gradient tube. The measurement results are shown in Table 1.

In the same manner as in the first example, a 200-core, SZ type optical fiber cable was obtained by accommodating five 4-core tape-form optical fibers in each groove. Measurements of the optical transmission performance showed this optical fiber cable to exhibit good performance of 0.20 dB/km.

Fifth Example

A single steel wire of 1.6 mmφ outer diameter was introduced as the tensile member 21 into a crosshead die, and an ethylene-ethyl acrylate copolymer resin (GA-006; made by NIPPON UNICAR Co. LTD ) was extrusion coated at 200° C. onto the outer periphery of the tensile member to obtain a coated tensile wire 22 with an outer diameter of 2.8 mmφ.

This coated tensile wire 22 was preheated to 60° C. and introduced into a rotating die, and after rotation extrusion coating a high-density polyethylene resin (Hizex 6600M; made by Mitsui Chemicals; flexural modulus: 833Mpa), with an MI of 0.03(g/10min), as the main spacer resin at an extrusion temperature of 170° C. and a rate of 10 m/min, the coated tensile wire was inserted into a pipe 6, having the structure shown in FIG. 3, an inner diameter of 9 mm, a length of 250 mm, and being provided at the central part with a cooling medium inlet 5, and was cooled by introduction of air at a flow rate of 30 m³/hr into the cooling medium inlet 5 to obtain a PE spacer 20 of 8.0 mmφ outer diameter.

The cross-sectional area of the hole of the nozzle part that was used was designed so that the drawdown, given as the value Sb/Snb, obtained by dividing the cross-sectional area Sb, obtained in turn by subtracting the cross-sectional area St of the coated tensile wire from the cross-sectional area Ss of the PE spacer to be made, by the cross-sectional area Snb, obtained in turn by subtracting the cross-sectional area St of the coated tensile wire from the cross-sectional area Sn of the nozzle hole, will be 100%.

The PE spacer 20 thus obtained had five trapezoidal grooves of 2.3 mm groove depth, 2.4 mm outer groove width, and 1.2 mm inner groove width positioned at equal intervals in the circumferential direction. These grooves had a spiral structure and were twisted in SZ-form at an inversion pitch of 160 mm and an inversion angle of 250°.The minimum rib thickness at the rib root was approximately 0.8 mm. The PE spacer obtained thus satisfied the various specifications.

Measurement of the groove inclination angle α in the cross section of the inversion part of the SZ spacer showed it to be approximately 15°, thus indicating that the groove inclination was restricted adequately.

Measurements by the same method as that of the first example showed the average surface roughness of the groove bottoms of this spacer 20 to be 0.66 μm.

One of the ribs of the SZ spacer formed from the main resin was cut off, this rib was divided into four parts from the root to the tip, and the resin densities were measured using a density gradient tube. The measurement results are shown in Table 1.

A 100-core, SZ type optical fiber cable was obtained by layering and accommodating five 4-coretape-form optical fibers of 0.32 mm thickness and 1.1 mm width in each groove of the above-described SZ spacer and providing a sheath coating by press winding non-woven fabric. Measurements of the optical transmission performance showed this optical fiber cable to exhibit good performance of 0.21 dB/km.

Sixth Example

Besides cooling the main spacer resin by inserting the main spacer resin into a cooling device of the same structure as the cooling device 1 used in the first example and cooling and solidifying the resin by blowing dry air perpendicularly onto the spacer at a wind velocity of 10 m/sec, a PE spacer 20 of 8.0 mmφ outer diameter was obtained by the same method as the fifth example.

The cross-sectional dimensions, inversion pitch, inversion angle, etc. of this SZ spacer were equivalent to those of the fifth example, and measurement of the groove inclination angle α at the inversion part section showed it to be approximately 17°.

Measurement by the same method as the first example showed the average surface roughness of the groove bottoms of this spacer 20 to be 0.70 μm.

One of the ribs of the SZ spacer formed from the main resin was cut off, this rib was divided into four parts from the root to the tip, and the resin densities were measured using a density gradient tube. The measurement results are shown in Table 1.

In the same manner as in the first example, a 100-core, SZ type optical fiber cable was obtained by accommodating five 4-core tape-form optical fibers in each groove. Measurements of the optical transmission performance showed this optical fiber cable to exhibit good performance of 0.22 dB/km.

Seventh Example

Besides cooling the main spacer resin by introducing the main spacer resin into the center of five circularly positioned spray nozzles (made by Spraying Systems Japan), which were directed inwards at a radius of 5 cm from the running center of the main spacer resin, and cooling and solidifying the resin by blowing on dry air at a wind velocity of 10 m/sec from a direction of 120° as viewed from the direction of progress of the spacer, a PE spacer 20 of 8.0 mmφ outer diameter was obtained by the same method as the fifth example.

The cross-sectional dimensions, inversion pitch, inversion angle, etc. of this SZ spacer were equivalent to those of the fifth example, and measurement of the groove inclination angle α at the inversion part section showed it to be approximately 16°.

Measurement by the same method as the first example showed the average surface roughness of the groove bottoms of this spacer 20 to be 0.64 μm.

One of the ribs of the SZ spacer formed from the main resin was cut off, this rib was divided into four parts from the root to the tip, and the resin densities were measured using a density gradient tube. The measurement results are shown in Table 1.

In the same manner as in the first example, a 100-core, SZ type optical fiber cable was obtained by accommodating five 4-core tape-form optical fibers in each groove. Measurements of the optical transmission performance showed this optical fiber cable to exhibit good performance of 0.22 dB/km.

Eighth Example

A stranded steel wire, made by stranding together seven single steel wires of 1.6 mmφ outer diameter each, was used as the tensile member. This tensile member was preheated to 100° C., introduced into a rotating die of a shape corresponding to the cross-sectional shape of the spacer, and after rotation extrusion coating a high-density polyethylene resin (Hizex 6600M; made by Mitsui Chemicals; flexural modulus: 833Mpa), with an MI of 0.03(g/10min), as the main spacer resin at an extrusion temperature of 170° C. and a rate of 10 m/min, the coated tensile wire was introduced into the cooling device 1 shown in FIG. 1 to cool and solidify the polyethylene resin.

The spacer was inserted into the center of cooling nozzle 4 and was run at a predetermined drawing speed in the direction indicated by the arrow in FIG. 1. Dry air, which was fed into annular space part 3, was blown out from cooling nozzle 4 at a wind velocity of 10 m/sec and perpendicularly (orthogonally) onto the spacer and was blown onto the groove bottoms of the spacer to cool the root parts of the ribs with priority over the intermediate parts. By applying such a cooling treatment, a PE spacer of 11.4 mmφ outer diameter was obtained.

The cross-sectional area of the hole of the resin discharge nozzle of the rotating die that was used was designed so that the drawdown, given as the value Sb/Snb, obtained by dividing the cross-sectional area Sb, obtained by subtracting the cross-sectional area St of the coated tensile wire from the cross-sectional area Ss of the PE spacer to be made, by the cross-sectional area Snb, obtained by subtracting the cross-sectional area St of the coated tensile wire from the cross-sectional area Sn of the nozzle hole, will be 95%.

The PE spacer thus obtained had ten trapezoidal grooves of 2.4 mm groove depth, 2.4 mm outer groove width, and 1.2 mm inner groove width positioned at equal intervals in the circumferential direction. These grooves had a spiral structure and were twisted in SZ-form at an inversion pitch of 230 mm (range of variation in the length direction of the spacer: 220 to 240 mm) and an inversion angle of 250°. The minimum rib thickness at the rib root was approximately 0.8 mm. The PE spacer obtained thus had the targeted dimensions and shapes and satisfied the various specifications.

Measurement of the groove inclination angle α in the cross section of the inversion parts of this SZ spacer showed it to be approximately 15°, thus indicating that the groove inclination was restricted adequately. Measurements by the same method as that of the first example showed the average surface roughness of the groove bottoms of the spacer to be 0.72 μm.

One of the ribs of the SZ spacer 10 formed from the main resin was cut off, this rib was divided into four parts from the root to the tip, and the resin densities were measured using a density gradient tube. The measurement results are shown in Table 1.

A 200-core, SZ type optical fiber cable was obtained by layering and accommodating five 4-coretape-form optical fibers of 0.32 mm thickness and 1.1 mm width in each groove of the above-described SZ spacer and providing a sheath coating by press winding non-woven fabric. Measurements of the optical transmission performance showed this optical fiber cable to exhibit good performance of 0.22 dB/km.

Ninth Example

A 100-core, SZ type optical fiber cable was obtained by accommodating ten single-core optical fibers, each of which was made by applying a coating layer of 62.5 μm thickness onto an optical fiber comprised of a core and a clad and having an outer diameter of 125 μm, in each spiral groove of the spacer of the first example and providing a sheath coating by press winding non-woven fabric. Measurements of the optical transmission performance showed this optical fiber cable to exhibit good performance of 0.22 dB/km.

Tenth Example

An aramid fiber (Kevlar 3120dtex; made by DU PONT-TORAY Co.,LTD), which was to serve as a reinforcing fiber, was impregnated with vinyl ester resin (H6400; made by Mitsui Chemicals) and was drawn to an outer diameter of 2.1 mm. The fiber was then introduced into a crosshead die and an LLDPE resin (NUCG 5350; made by NIPPON UNICAR Co. LTD ) was extrusion coated. After cooling the coating resin on the surface, the fiber was placed in a steam curing tank set to 145° C. to cure the polyester resin in the interior to obtain a coated tensile wire of 2.8 mmφ outer diameter.

This coated tensile wire was preheated to 60° C. and introduced into a rotating die of a shape corresponding to the cross-sectional shape of the spacer, and after rotation extrusion coating a high-density polyethylene resin (Hizex 660M; made by Mitsui Chemicals; flexural modulus: 833 Mpa), with an MI of 0.03(g/10 min), as the main spacer resin 13 at an extrusion temperature of 170° C. and a rate of 10 m/min, the coated tensile wire was introduced into the cooling device 1 shown in FIG. 1 to cool and solidify the polyethylene resin.

With cooling device 1, the dry air, which was used as the cooling medium, was blown out from cooling nozzle 4 at a wind velocity of 10 m/sec and perpendicularly (orthogonally) onto the spacer and was blown onto the groove bottoms of the spacer to cool the root parts of the ribs with priority over the intermediate parts. By applying such a cooling treatment, an SZ type PE spacer of 8.0 mmφ outer diameter was obtained.

The cross-sectional area of the hole of the nozzle part that was used was designed so that the drawdown, given as the value of Sb/Snb, obtained by dividing the cross-sectional area Sb, obtained by subtracting the cross-sectional area St of the coated tensile wire from the cross-sectional area Ss of the PE spacer to be made, by the cross-sectional area Snb, obtained by subtracting the cross-sectional area St of the coated tensile wire from the cross-sectional area Sn of the nozzle hole, will be 95%.

The PE spacer thus obtained had five trapezoidal grooves of 2.4 mm groove depth, 2.7 mm outer groove width, and 1.2 mm inner groove width positioned at equal intervals in the circumferential direction. These grooves had a spiral structure and were twisted in SZ-form at an inversion pitch of 175 mm (range of variation in the length direction of the spacer: 167 to 183 mm) and an inversion angle of 250°. The minimum rib thickness at the rib root was approximately 0.8 mm, the average surface roughness Ra ($\mu$m) of the groove bottoms of the spacer was 0.68 $\mu$m, and the PE spacer thus had the targeted dimensions and shapes and satisfied the various specifications.

Measurement of the groove inclination angle $\alpha$ in the cross section of the inversion part of this SZ spacer 10 showed it to be approximately 15°, thus indicating that the groove inclination was restricted adequately (see FIG. 4).

One of the ribs of the SZ spacer 10 formed from the main resin was cut off, this rib was divided into four parts (a to d) from the root to the tip as shown in FIG. 2, and the resin densities were measured using a density gradient tube. The measurement results are shown in Table 1.

A 100-core, SZ type optical fiber cable was obtained by layering and accommodating five 4-coretape-form optical fibers of 0.32 mm thickness and 1.1 mm width in each groove of the above-described SZ spacer and providing a sheath coating by press winding non-woven fabric. Measurements of the optical transmission performance showed this optical fiber cable to exhibit good performance of 0.22 dB/km.

Eleventh Example

In a process continuous to the spacer forming process of the tenth example, a 100-core, SZ type optical fiber cable was obtained by layering and accommodating five 4-coretape-form optical fibers of 0.32 mm thickness and 1.1 mm width in each groove of the SZ type PE spacer of 8.0 mm$\phi$ outer diameter obtained in the tenth example and providing a sheath coating by press winding non-woven fabric. Measurements of the optical transmission performance showed this optical fiber cable to exhibit good performance of 0.22 dB/km.

By employing such a method for producing optical fiber cables, the rib deformation, which can be a problem in winding an SZ type PE spacer once in a winding drum, can be prevented and the work of inserting interlayer paper, which becomes necessary in the winding work, can be eliminated.

Twelfth Example

A single steel wire of 2.0 mm$\phi$ outer diameter was introduced as the tensile member into a crosshead die, and an ethylene-ethyl acrylate copolymer resin (GA-006; made by NIPPON UNICAR Co. LTD) and an LLDPE resin (NCG 5350; made by NIPPON UNICAR Co. LTD flexure modulus: 353 Mpa) were co-extrusion coated at 200° C. as inner preliminary coating layer and outer preliminary coating layer, respectively, onto the outer periphery of the above-mentioned tensile member to obtain a coated tensile wire, with which the outer diameter of the ethylene-ethyl acrylate polymer layer was 2.8 mm$\phi$ and the outer diameter of the LLDPE resin coating at the outer side was 4.4 mm$\phi$.

This coated tensile wire was preheated to 60° C. and introduced into a rotating die, and after rotation extrusion coating a high-density polyethylene resin (Hizex 6600M; made by Mitsui Chemicals), with an MI of 0.03(g/10 min), as the main spacer resin at an extrusion temperature of 170° C. and a rate of 10 m/min, the coated tensile wire was introduced into the cooling device 1 shown in FIG. 1 and thereby cooled and solidified under the same conditions as the first example to obtain a PE spacer of 8.5 mm$\phi$ outer diameter.

The cross-sectional area of the hole of the nozzle part that was used was designed so that the drawdown, given as the value of Sb/Snb, obtained by dividing the cross-sectional area Sb, obtained in turn by subtracting the cross-sectional area St of the coated tensile wire from the cross-sectional area Ss of the PE spacer to be made, by the cross-sectional area Snb, obtained in turn by subtracting the cross-sectional area St of the coated tensile wire from the cross-sectional area Sn of the nozzle hole, will be 95%.

The PE spacer thus obtained had six substantially U-shaped grooves of 1.7 mm groove depth and 3.0 mm outer groove width positioned at equal intervals in the circumferential direction. These grooves had a spiral structure and were twisted in SZ-form at an inversion pitch of 125 mm (range of variation in the length direction of the spacer: 122 to 127 mm) and an inversion angle of 275°, and the PE spacer thus satisfied the specifications. Also, the spiral progression angle $\beta$, approximated by the following equation was 9.26°.

Spiral progression angle ($\beta$): $\tan\beta = (d \times \pi \times \theta/360)/p$ In the above, d is the outer diameter of the spacer, $\theta$ is the inversion angle of the spiral grooves, and p is the inversion pitch of the spiral grooves.

Measurement of the groove inclination angle in the cross section of the inversion part of this SZ spacer 10 showed it to be approximately 14°, thus indicating that the groove inclination was restricted adequately.

First Comparative Example

Besides cooling the main spacer resin by inserting the main spacer resin into an acrylic pipe, having an inner diameter of 75 mm$\phi$ and a length of 4 m, and cooling and solidifying the resin using a ring-like nozzle to blow dry air at a wind velocity of 10 m/hr parallel to the spacer from the exit direction (side to which the spacer is drawn) of the pipe, a PE spacer of 11.4 mm$\phi$ outer diameter was obtained by the same method as the first example.

Though the cross-sectional dimensions, inversion pitch, inversion angle, etc. of this SZ spacer were equivalent to those of the first example, the measurement of the groove inclination angle $\alpha$ at the inversion part section showed it to be inclined at approximately 20°.

One of the ribs of the SZ spacer formed from the main resin was cut off, this rib was divided into four parts from the root to the tip, and the resin densities were measured using a density gradient tube. The measurement results are shown in Table 1.

In the same manner as in the first example, a 200-core, SZ type optical fiber cable was obtained by accommodating five 4-core tape-form optical fibers in each groove. Measurements of the transmission performance showed the performance to be scattered from 0.25 to 0.42 dB/km.

Second Comparative Example

Besides cooling the main spacer resin by inserting the main spacer resin into an SUS pipe, having an inner diameter of 75 mm$\phi$, a length of 4 m, and being provided with a packing with a hole diameter of 12 mm$\phi$ at the exit side, and cooling and solidifying the resin by introducing warm water of 40° C., to which a surfactant (Marpon 60; made by Matsumoto Yushi-Seiyaku Co.,Ltd) was added to a concentration of 0.1 wt %, into the pipe from the bottom and making this warm water overflow from the top, a PE spacer of 11.4 mm$\phi$ outer diameter was obtained by the same method as the first example.

Though the cross-sectional dimensions, inversion pitch, inversion angle, etc. of this SZ spacer were equivalent to those of the first example, the measurement of the groove inclination angle a at the inversion part section showed it to be inclined at approximately 22°.

One of the ribs of the SZ spacer formed from the main resin was cut off, this rib was divided into four parts from the root to the tip, and the resin densities were measured using a density gradient tube. The measurement results are shown in Table 1.

In the same manner as in the first example, a 200-core, SZ type optical fiber cable was obtained by accommodating five 4-core tape-form optical fibers in each groove. Measurements of the transmission performance showed the performance to be scattered from 0.25 to 0.62 dB/km.

Third Comparative Example

Besides cooling the main spacer resin by inserting the main spacer resin into an acrylic pipe, having an inner diameter of 75 mmφ and a length of 4 m, and cooling and solidifying the resin using a ring-like nozzle to blow dry air at a wind velocity of 10 m/hr parallel to the spacer from the exit direction (side to which the spacer is drawn) of the pipe, a PE spacer of 8.0 mmφ outer diameter was obtained by the same method as the fifth example.

Though the cross-sectional dimensions, inversion pitch, inversion angle, etc. of this SZ spacer were equivalent to those of the fifth example, the measurement of the groove inclination angle α at the inversion part section showed it to be inclined greatly at approximately 28°.

One of the ribs of the SZ spacer formed from the main resin was cut off, this rib was divided into four parts from the root to the tip, and the resin densities were measured using a density gradient tube. The measurement results are shown in Table 1.

In the same manner as in the fifth example, a 100-core, SZ type optical fiber cable was obtained by accommodating five 4-core tape-form optical fibers in each groove. Measurements of the transmission performance showed the performance to be scattered from 0.30 to 0.75 dB/km.

Fourth Comparative Example

Besides cooling the main spacer resin by inserting the main spacer resin into an SUS pipe, having an inner diameter of 75 mmφ, a length of 1 m, and being provided with a packing with a hole diameter of 9 mmφ at the exit side, and cooling and solidifying the resin by introducing warm water of 40° C., to which a surfactant (Marpon 60; made by Matsumoto Yushi-Seiyaku Co.,Ltd) was added to a concentration of 0.1 wt %, into the pipe from the bottom and making this warm water overflow from the top, a PE spacer of 8.0 mmφ outer diameter was obtained by the same method as the fifth example.

Though the cross-sectional dimensions, inversion pitch, inversion angle, etc. of this SZ spacer were equivalent to those of the fifth example, the measurement of the groove inclination angle α at the inversion part section showed it to be inclined greatly at approximately 30°.

One of the ribs of the SZ spacer formed from the main resin was cut off, this rib was divided into four parts from the root to the tip, and the resin densities were measured using a density gradient tube. The measurement results are shown in Table 1.

In the same manner as in the fifth example, a 100-core, SZ type optical fiber cable was obtained by accommodating five 4-core tape-form optical fibers in each groove. Measurements of the transmission performance showed the performance to be scattered from 0.30 to 0.95 dB/km.

Fifth Comparative Example

Besides cooling the main spacer resin by circularly positioning five inwardly-directed spray nozzles (made by Spraying Systems Japan) at a radius of 5 cm from the running center of the main spacer resin, and cooling and solidifying the resin by blowing on dry air at a wind velocity of 10 m/sec from a direction of 170° as viewed from the direction of progress of the spacer, a PE spacer of 8.0 mmφ outer diameter was obtained by the same method as the fifth example.

Though the cross-sectional dimensions, inversion pitch, inversion angle, etc. of this SZ spacer were equivalent to those of the fifth example, the measurement of the groove inclination angle α at the inversion part section showed it to be inclined at approximately 24°.

One of the ribs of the SZ spacer formed from the main resin was cut off, this rib was divided into four parts from the root to the tip, and the resin densities were measured using a density gradient tube. The measurement results are shown in Table 1.

In the same manner as in the fifth example, a 100-core, SZ type optical fiber cable was obtained by accommodating five 4-core tape-form optical fibers in each groove. Measurements of the transmission performance showed the performance to be scattered from 0.26 to 0.64 dB/km.

Sixth Comparative Example

Besides cooling the main spacer resin by circularly positioning five inwardly-directed spray nozzles (made by Spraying Systems Japan) at a radius of 5 cm from the running center of the main spacer resin, and cooling and solidifying the resin by blowing on dry air at a wind velocity of 10 m/sec from a direction of 20° as viewed from the direction of progress of the spacer, a PE spacer of 8.0 mmφ outer diameter was obtained by the same method as the fifth example.

Though the cross-sectional dimensions, inversion pitch, inversion angle, etc. of this SZ spacer were equivalent to those of the fifth example, the measurement of the groove inclination angle α at the inversion part section showed it to be inclined at approximately 23°.

One of the ribs of the SZ spacer formed from the main resin was cut off, this rib was divided into four parts from the root to the tip, and the resin densities were measured using a density gradient tube. The measurement results are shown in Table 1.

In the same manner as in the fifth example, a 100-core, SZ type optical fiber cable was obtained by accommodating five 4-core tape-form optical fibers in each groove. Measurements of the transmission performance showed the performance to be scattered from 0.26 to 0.62 dB/km.

Seventh Comparative Example

Besides using a high-density polyethylene resin (Hizex 530M; made by Mitsui Chemicals), with an MI of 0.4(g/10min), as the main spacer resin and setting the extrusion temperature to 150° C., an SZ spacer of 11.4 mmφ outer diameter was obtained by the same method as the third example.

The cross-sectional dimensions, inversion pitch, inversion angle, etc. of this SZ spacer were equivalent to those of the third example, and the average surface roughness of the groove bottoms was 1.5 μm. The transmission loss of an optical cable using this spacer was 0.25 to 0.36 dB/km, showing the optical cable to be scattered in performance.

Eighth Comparative Example

Besides using a resin discharge nozzle for rotating die, the cross-sectional area of the hole of which was designed so that the drawdown, given as the value Sb/Snb, obtained by dividing the cross-sectional area Sb, obtained in turn by subtracting the cross-sectional area St of the coated tensile wire from the cross-sectional area Ss of the PE spacer to be made, by the cross-sectional area Snb, obtained in turn by subtracting the cross-sectional area St of the coated tensile wire from the cross-sectional area Sn of the nozzle hole, will be 65%, an SZ spacer of 11.4 mmφ outer diameter was obtained under the same conditions as the first example.

The groove inclination angle α of this SZ spacer was approximately 35° and did not enable the accommodating of the prescribed number of tape-form optical fibers.

Ninth Comparative Example

Besides winding the coated tensile member of 2.8 mmφ outer diameter once around a winding drum and then forming the main spacer coating in a separate process, an SZ type spacer of 8.0 mmφ outer diameter was obtained by the same process as the tenth example.

The inversion pitch of this SZ spacer was affected by the curling tendency of the coated tensile member, and the range of variation of the inversion pitch in the length direction of the spacer exhibited scattering of 145 to 205 mm. When the transmission of a 100-core optical fiber cable was measured by the same method used in the tenth example, the transmission performance was found to be scattered from 0.27 to 0.35 dB/km.

Tenth Comparative Example

Besides setting the inversion pitch of the spiral grooves to 75 mm (73 to 77 mm), a PE spacer of 8.5 mmφ outer diameter was obtained in the same method as the twelfth example. The spiral progression angle of the obtained spacer, as measured in the same manner as in the twelfth example, was 15.22°.

Measurement of the groove inclination angle at the groove inversion part of this spacer showed it to be approximately 20° and inclined greatly in comparison to the twelfth example.

The measurement results of the groove inclination angle α, resin densities according to rib part, and transmission loss, in the case where a tape core fiber was mounted in the SZ spacer to provide an optical cable, are summarized for the above examples and comparative examples in Tables 1 and 2 below.

TABLE 1

| No. | Inclination angle α (°) | Resin density (g/cc) | | | | Transmission loss (dB/km) |
|---|---|---|---|---|---|---|
| | | Root of rib a | Rib center (root) b | Rib center (tip) c | Tip of rib d | |
| First example | 14 | 0.9501 | 0.9506 | 0.9508 | 0.9506 | 0.21 |
| Second example | 12 | 0.9498 | 0.9506 | 0.9503 | 0.9501 | 0.20 |
| Third example | 10 | 0.9463 | 0.9477 | 0.9477 | 0.9467 | 0.19 |
| Fourth example | 11 | 0.9461 | 0.9470 | 0.9476 | 0.9462 | 0.20 |
| Fifth example | 15 | 0.9502 | 0.9510 | 0.9511 | 0.9509 | 0.21 |
| Sixth example | 17 | 0.9500 | 0.9505 | 0.9512 | 0.9508 | 0.22 |
| Seventh example | 16 | 0.9499 | 0.9507 | 0.9507 | 0.9504 | 0.22 |
| Eighth example | 15 | 0.9497 | 0.9504 | 0.9505 | 0.9502 | 0.22 |
| Ninth example | — | — | — | — | — | 0.22 |
| Tenth example | 15 | 0.9497 | 0.9504 | 0.9505 | 0.9502 | 0.22 |
| Eleventh example | — | — | — | — | — | 0.22 |
| First comparative example | 20 | 0.9507 | 0.9506 | 0.9505 | 0.9501 | 0.25 to 0.42 |
| Second comparative example | 22 | 0.9473 | 0.9475 | 0.9477 | 0.9464 | 0.25 to 0.62 |
| Third comparative example | 28 | 0.9512 | 0.9510 | 0.9509 | 0.9508 | 0.30 to 0.75 |
| Fourth comparative example | 30 | 0.9484 | 0.9485 | 09486 | 0.9480 | 0.30 to 0.95 |
| Fifth comparative example | 24 | 0.9507 | 0.9505 | 0.9507 | 0.9508 | 0.26 to 0.64 |
| Sixth comparative example | 23 | 0.9508 | 0.9507 | 0.9506 | 0.9505 | 0.26 to 0.62 |

TABLE 2

| | d | θ | p | β | Groove inclination angle α |
|---|---|---|---|---|---|
| First example | 11.4 | 250 | 230 | 6.16 | 14 |
| Fifth example | 8.0 | 250 | 160 | 6.22 | 15 |
| Tenth example | 8.0 | 275 | 175 | 6.28 | 15 |
| Twelfth example | 8.5 | 275 | 125 | 9.26 | 14 |
| Tenth comparative example | 8.5 | 275 | 75 | 15.22 | 20 |

Figure 5:
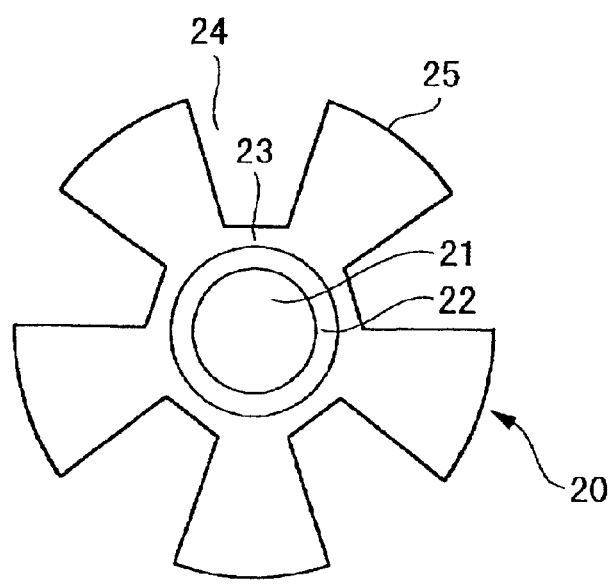
FIG. 5 is a sectional view of rotation of the SZ spacer of the fifth to seventh examples of this invention.
Figure 6:
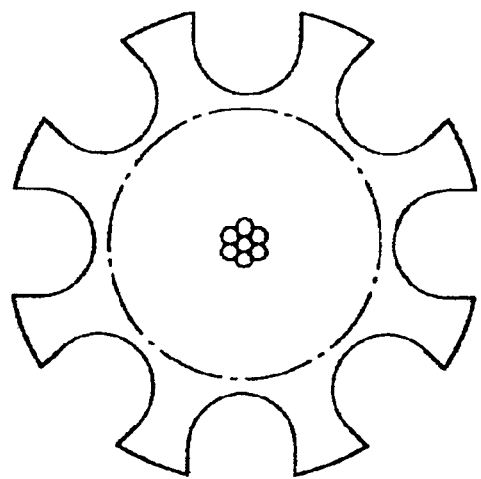
FIG. 6 is a diagram, which shows the cross-sectional shape of another example of a spacer by this invention.
Figure 7:
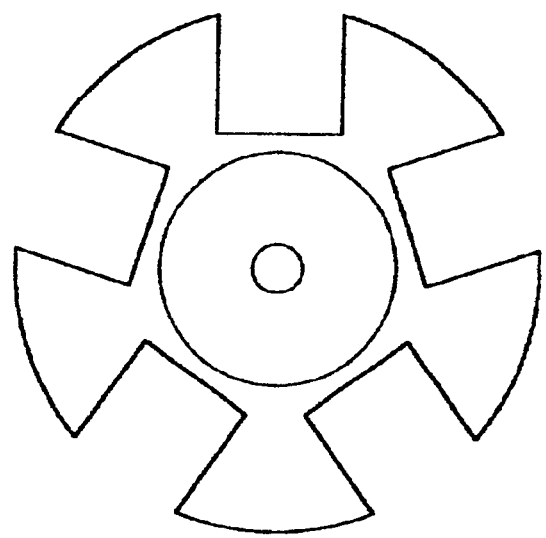
FIG. 7 is a diagram, which shows the cross-sectional shape of yet another example of a spacer by this invention.

The spacer of this invention is not limited to that of the cross-sectional shape shown in FIG. 1 or 5, and this invention may for example be applied to a spacer with spiral grooves with a substantially U-shaped cross section as shown in FIG. 6 as well as to a spacer, with which the side faces of the cross sections of the spiral grooves are formed in parallel manner as shown in FIG. 7.

As has been described in detail by way of the examples and comparative examples above, since with the SZ spacer of this invention, the groove inclination at the inversion part can be restricted even when designed to be thin in diameter and small in minimum rib thickness, this invention provides an extremely practical spacer with which the increase of the transmission loss in the case where optical fibers are mounted is small.

Also the spacer of this invention can be designed to have a short inversion pitch that enables the optical fibers housed in the spiral grooves to be provided with extra length to secure ease of pulling out for the purpose of improving the workability in the laying of cables and, at the same time, secure the necessary core wire pulling force for preventing the falling off of the fibers from the spiral grooves in which they are housed.

Furthermore with regard to the loci of the spiral grooves, which is an important factor in the stabilization of the transmission characteristics of the cable, since the phenomenon of corotation of the coating resin and tensile member can be restricted with the spacer of this invention, the loci of the spiral grooves can be formed as normal sine curves.

Also, the spacer with SZ spiral grooves of this invention that has been made thin in diameter can be used extremely effective in optical fiber cables that house optical tape cords, which enable high densities and multiple core wiring in a limited space, such as in optical wiring modules, etc. within a telephone office. That is, in an application to a 100-core local optical fiber cable, since the outer diameter of the cable can be made small, the cross-sectional area of the cable can be reduced significantly in comparison to prior cables that house the same number of cores and the laying work can also be made efficient since the flexibility is improved.

The optical fiber cable by this invention thus enables realization of SZ type optical fiber cables that are made thin in diameter.

Also the production method of this invention enables the provision of SZ spacers with which the groove inclination is restricted in the inversion parts.

Furthermore with the production method of this invention, since the inclination of the spiral grooves can be restricted even when the main spacer coating resin has a relatively high melt index value (MI), it provides the advantage that a resin of high MI, such as recycled resin, can be used.

Also since the rib inclination of the spiral grooves can be restricted, the precision of the outer diameter in the length direction of the spacer can be improved, thereby enabling improvement of the speed of integration of optical fibers and prevention of increased transmission loss in the process of laying optical fibers.

Industrial Applicability

Since the spacer with SZ spiral grooves of this invention can be made thin in diameter, it can be used extremely effectively in optical fiber cables that realize high densities and multiple core wiring in a limited space, such as in optical wiring modules, etc. within a telephone office.

What is claimed is:

1. A polyethylene spacer for optical fiber cable including a central tensile member, an intermediate coating layer arranged on an outer periphery of the central tensile member and being compatible with polyethylene and a main coating arranged on an outer periphery of the intermediate coating layer and having continuous spiral grooves for accommodating optical fibers and which are inverted periodically in a lengthwise direction, the main coating being formed from polyethylene resin, said spacer for optical fiber cable including a plurality of ribs defining said spiral grooves, a minimum rib thickness of said ribs being 1.0 mm or less and a groove inclination angle of a cross-section of said spacer inversion parts being 18° or less, a resin density of a root part of each of said ribs being the lowest in comparison to a resin density at a tip part of said rib and central parts of said rib between said root part of said rib and said tip part of said rib.

2. A polyethylene spacer for optical fiber cable, including a central tensile member and a main coating formed from polyethylene resin and arranged on an outer periphery of the central tensile member, the main coating having continuous spiral grooves for accommodating optical fibers and being inverted periodically in a lengthwise direction, said spacer for optical fiber cable including a plurality of ribs defining said spiral grooves, a minimum rib thickness of said ribs being 1.0 mm or less and a groove inclination angle of a cross-section of said spacer at inversion parts being 18° or less, a resin density of a root part of each of said ribs being the lowest in comparison to a resin density at a tip part of said rib and central parts of said rib between said root part of said rib and said tip part of said rib.

3. An optical fiber cable including a spacer as set forth in claim 1 or 2 and a single-core optical fiber housed in at least one or more spiral grooves of said spacer.

4. A spacer as set forth in claim 1 or 2, wherein an average roughness of the groove bottoms of said spiral grooves is 1.2 μm or less.

5. A spacer as set forth in claim 1 or 2, wherein a spiral progression angle (β), as determined by:

$$\tan\beta = (d \times \pi \times \theta / 360)/p$$

where d is an outer diameter of said spacer, θ is a spiral groove inversion angle, and p is a spiral groove inversion pitch, is from 5° to 15°.

6. An optical fiber cable including a spacer as set forth in claim 1 or 2 and a plurality of tape-form optical fibers housed in at least one or more spiral grooves of said spacer.

* * * * *